(12) United States Patent
Nagarajan et al.

(10) Patent No.: US 6,516,091 B1
(45) Date of Patent: Feb. 4, 2003

(54) BLOCK LEVEL ANALYSIS OF SEGMENTATION TAGS

(75) Inventors: Ramesh Nagarajan, Fairport, NY (US); Xing Li, Webster, NY (US); Michael E. Meyers, Fairport, NY (US); Francis K. Tse, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/392,902

(22) Filed: Sep. 9, 1999

(51) Int. Cl.[7] .............................. G06K 9/00; G06K 9/34; G06K 9/54; G06K 9/62; H04N 1/40
(52) U.S. Cl. .................. 382/173; 382/164; 382/165; 382/170; 382/171; 382/175; 382/180; 382/224; 382/306; 358/462
(58) Field of Search .................. 382/170, 171, 382/173, 180, 224, 282, 306, 305; 358/462, 2.1

(56) References Cited

U.S. PATENT DOCUMENTS

| | | | |
|---|---|---|---|
| 5,327,262 A | 7/1994 | Williams et al. ............ 358/462 |
| 5,699,453 A * | 12/1997 | Ozaki ........................ 382/176 |
| 5,765,029 A | 6/1998 | Schweid et al. .............. 395/61 |
| 5,767,978 A | 6/1998 | Revankar et al. ........... 358/296 |
| 5,778,156 A | 7/1998 | Schweid et al. .............. 395/61 |
| 5,848,185 A * | 12/1998 | Koga et al. ................. 382/173 |
| 5,850,474 A | 12/1998 | Fan et al. ................... 382/173 |
| 5,956,468 A * | 9/1999 | Ancin ........................ 382/164 |
| 6,175,650 B1 * | 1/2001 | Sindhu et al. .............. 382/171 |
| 6,198,850 B1 * | 3/2001 | Banton ....................... 382/173 |
| 6,240,205 B1 * | 5/2001 | Fan et al. ................... 382/173 |
| 6,268,935 B1 * | 7/2001 | Kingetsu et al. ............ 358/433 |
| 6,337,917 B1 * | 1/2002 | Onural et al. ............... 382/173 |

* cited by examiner

*Primary Examiner*—Phuoc Tran
*Assistant Examiner*—Amir Alavi
(74) *Attorney, Agent, or Firm*—William F. Eipert

(57) ABSTRACT

A system for processing segmentation tags to generate a block level tag representative of a group of segmentation tags. The system includes first and second statistic compilation circuits, each of the compilation circuits being connected to receive segmentation tags and compile a statistic for a plurality of the received segmentation tags. An address controller connected to the first and second statistic compilation circuits operates to select one of the first and second compilation circuits to receive the segmentation tags.

15 Claims, 10 Drawing Sheets

|     |     |     |     |     |
|-----|-----|-----|-----|-----|
| $x_1$ | $x_2$ | $x_3$ | $x_4$ | $x_5$ |
| $x_6$ | $x_7$ | $x_8$ | $x_9$ | $x_{10}$ |
| $x_{11}$ | $x_{12}$ | $x_{13}$ |     |     |
|     |     |     |     |     |
|     |     |     |     | $x_{25}$ |

BLOCK LEVEL ANALYSIS OF SEGMENTATION TAGS

CROSS REFERENCE

Cross reference is made to the following related applications "Segmentation Tag Cleanup System" by R. Nagarajan et al., U.S. patent application Ser. No. 09/393,094; "Segmentation Tag Cleanup Using Neighborhood Tags" by R. Nagarajan et al., U.S. patent application Ser. No. 09/393,008; "Pixel Level Segmentation Tag Cleanup" by X. Li et al., U.S. patent application Ser. No. 09/393,080; and "Segmentation Tag Cleanup Based On Connected Components" by R. Nagarajan et al., U.S. patent application Ser. No. 09/392,801.

BACKGROUND OF THE INVENTION

The present invention relates to a system and method for processing segmentation tags, and more particularly, to a system and method to clean segmentation tags to reduce artifacts resulting from misclassification and abrupt changes in image classification.

In the reproduction or display of images from image data, and more particularly, to the rendering of image data representing original document that has been electronically scanned, one is faced with the limited resolution capabilities of the rendering system. An image processing system may be tailored so as to offset the limitations of the rendering system; however, this tailoring is difficult due to the divergent processing needs required by different image types.

Optimizing the system for one common image type typically comes at the expense of degraded rendering of other image types. For example, optimizing the system for low frequency halftones often comes at the expense of degraded rendering of high frequency halftones or text/line art, and visa versa. In view of this, optimizing the image processing system for one image type in an effort to offset the limitations in the resolution and the depth capability of the rendering apparatus may not be possible, requiring a compromised choice which may not produce acceptable results. Further complicating the reproduction of original documents is the reality that a document may be comprised of multiple image types (image classes), including continuous tones (contones), halftones of various frequencies, text/line art, error diffused images, etc.

To address this situation, digital reproduction devices often use automatic image segmentation techniques. Auto-segmentation is a well known operation that may use any of a number of classification functions (e.g., auto-correlation, frequency analysis, pattern or template matching, peak/valley detection, histograms, etc.) to analyze video image data and classify image pixels as one of several possible image classes. A typical auto-segmentation process generates a pixel classification signal, known as a segmentation tag, that identifies the pixel as a particular image class. Some common image types (image classes) include smooth contone, rough contone, text, text on tint, low frequency halftone, high frequency halftone, various intermediate frequency halftones which may be implemented as fuzzy frequencies, background and edge.

A one-pass digital reprographic system (scanning and printing done in a single pass of the image) gets just one chance to analyze and classify each pixel of an image based on a few scanlines of neighboring data. Due to the limited context for classification often one-pass segmentation results in erroneous switching between categories and since different categories require different type of rendering, any misclassification results in segmentation defects on the final rendered image. Conventional segmentation techniques base classification decisions on information gathered over context of several pixels from a few scanlines of neighboring data, effectively causing the image data to be lowpass filtered. The resulting classification decisions change from one class of imagery to another causing abrupt changes in the wrong places. This abrupt decision making, which produces a forced choice among several discrete alternate choices, is a primary reason for the formation of visible artifacts in the resulting output image.

Moreover, the classification of real images covers a continuum from well below to well above the transition point or thresholds used to delineate classifications. There are areas of an image which are, for example, just above a threshold. However, variations in the gathered image data due to "flaws" in the input video or ripple due to interactions between areas used for classification and periodic structures in the input video result in some areas falling below the threshold. This results in a different classification that introduces artifacts in the rendered image.

Several approaches to improve segmentation processes to reduce the segmentation artifacts resulting from misclassification and/or abrupt changes in image classification have been employed with varying degrees of success. The following references may be found relevant to the present disclosure:

U.S. Pat. No. 5,327,262 to Williams which discloses in conjunction with an image segmentation arrangement in which an image is processed with an image type detection arrangement, a morphological filtering operation which initially provides a noise removal filter operating an the image detection signal to remove noise within an area of the image detection signal and subsequently provides a hole filling filter which bridges small gaps in the image type detection results.

U.S. Pat. No. 5,765,029 to Schweid et al. discloses a method and system that electronically fuzzy classify a pixel belonging to a set of digital image data with respect to a membership of the pixel in a plurality of image classes. This process determines a fuzzy classification of the pixel and generates an effect tag for the pixel based on the fuzzy classification determination. Each class is defined by a set of heuristic rules such that the image classes are non mutually exclusive.

U.S. Pat. No. 5,850,474 to Fan et al. discloses a method and apparatus for segmenting image data into windows and for classifying the windows as typical image types which include making two passes through the image data. The method includes a step of making a first pass through the image data to identify windows and to record the beginning points and image types of each of the windows, and a step of making a second pass through the image data to label each of the pixels as a particular image type.

SUMMARY OF THE INVENTION

In accordance with the present invention, there is provided a method of processing segmentation tags to identify a block level tag representative of a block of segmentation tags. The method identifies a block of the segmentation tags and compiles a block statistic from a plurality of segmentation tags within the block. The method generates the block level tag for the identified block based on the complied block statistic.

In accordance with another aspect of the present invention, there is provided a system for processing segmentation tags to generate a block level tag representative of a group of segmentation tags. The system includes first and second statistic compilation circuits, each of the compilation circuits being connected to receive segmentation tags and compile a statistic for a plurality of the received segmentation tags. An address controller connected to the first and second statistic compilation circuits operates to select one of the first and second compilation circuits to receive the segmentation tags.

In accordance with another aspect of the present invention, there is provided a system for processing video image data. The system comprises a segmentation processor coupled to receive the video image data. The segmentation processor generates segmentation tags that identify image pixels as one of several predefined image classes. A block tag generator connected to receive the segmentation tags from the segmentation processor identifies a block of the received segmentation tags, compiles a statistic for the identified block and generates a block level tag from the compiled statistic. A print engine connected to receive the video image data and the block tag, the print engine generating an image on a receiving medium in response to the video image data and the block tag.

BRIEF DESCRIPTION OF THE DRAWINGS

The following is a brief description of each drawing used to describe the present invention, and thus, are being presented for illustrative purposes only and should not be limitative to the scope of the present invention, wherein like reference numbers represent like devices, circuits, or circuits performing equivalent functions and wherein:

FIG. 5 illustrates an exemplary 5×5 neighborhood block employed by an embodiment of the present invention;

FIG. 6 is an exemplary transition block employed by an embodiment of the present invention;

DESCRIPTION OF THE PREFERRED EMBODIMENT

In accordance with the present invention there is described an apparatus and method for processing segmentation tags. The term "segmentation tag" or "tag" may refer to an electrical or optical signal that identifies or represents an image type or image class for a definable area within an image. The following description makes reference to pixel level segmentation tags and block level segmentation tags. A "pixel level segmentation tag" or "pixel level tag" refers to a segmentation tag for an image pixel. A "block level segmentation tag" or "block level tag" refers to a segmentation tag that is representative of a plurality of segmentation tags. That is, a block level segmentation tag can be a representative tag for a plurality of pixel level segmentation tags or for a plurality of block level segmentation tags.

Figure 13:
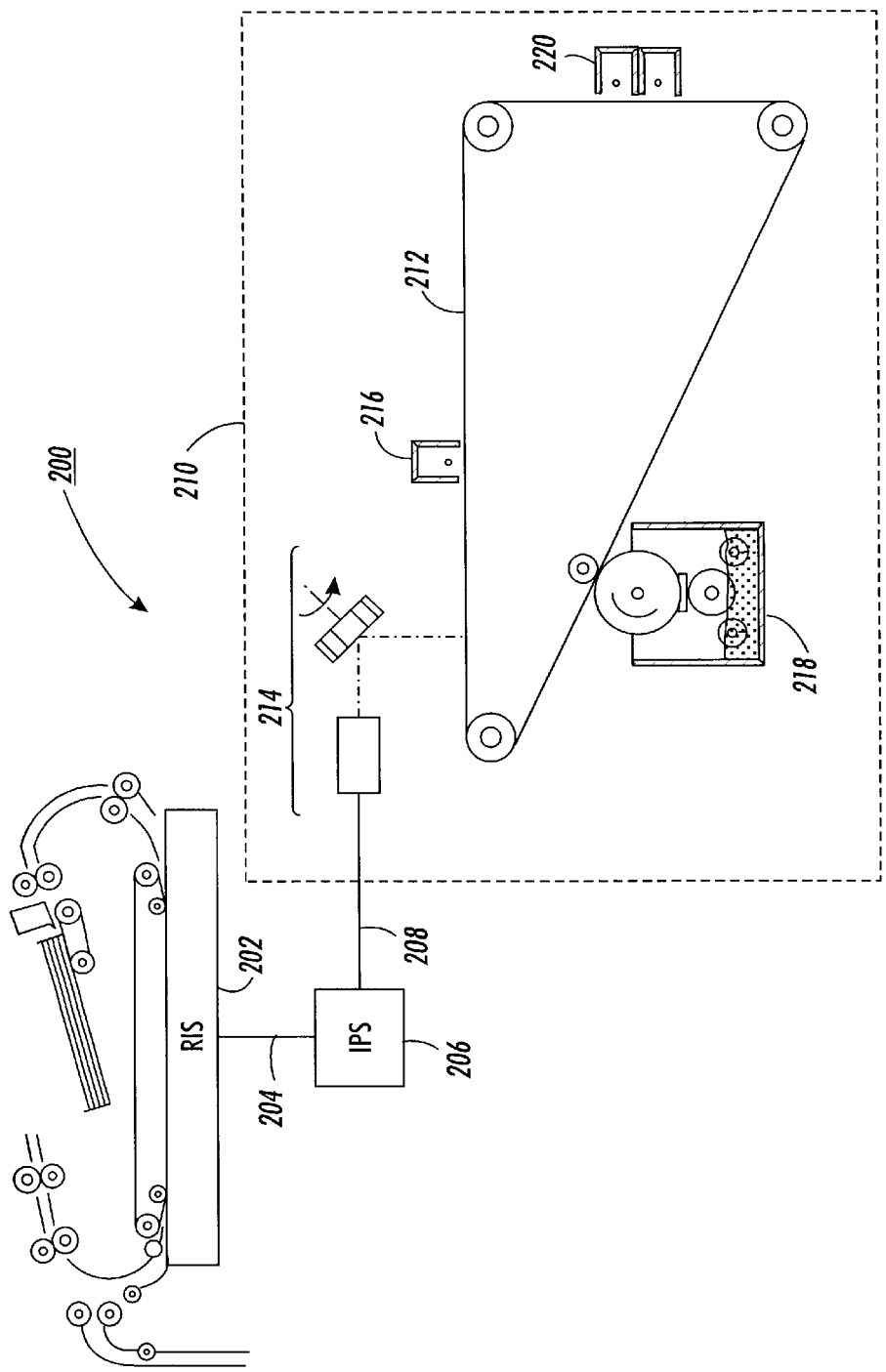
FIG. 13 is a general representation of a suitable system-level embodiment for one or more aspects of the present invention.

Turning now to FIG. 13, there is shown an embodiment of a digital imaging system 200 that incorporates features of the present invention. Digital imaging system 200 includes image source 202 such as a raster input scanner or similar image input terminal to provide image data 204 to image processing system 206. Image data 204 may be obtained through line by line scanning of an image bearing the original by one or more photosensitive elements, such as a multiple photosite array of charge couple devices commonly referred to as CCDs. Line by line scanning of an image bearing the original for the duration of image data is well known and does not form a part of the present invention. Although shown as a raster input scanner, it is understood that image source 202 may comprise a computer workstation, a data storage device, a network or any similar or equivalent image input terminal to generate image data 204.

Image processing system (IPS) 206 processes the received image data 204 to produce print ready data 208 that is supplied to print engine 210. In response to print ready data 208, print engine 210 generates an output image on suitable media (e.g., print or display). Although illustrated as an electrophotographic engine, it will become evident from the following discussion that the present invention is useful with a wide variety of output devices such as ink jet, ionographic, thermal, etc. Furthermore, the present invention is not limited in its application to copying and printing machines and may be incorporated in other output terminals such as electronic display systems including CRTs, LCDs, LED, etc.

Print engine 210 is shown as operating on print ready data 208 from IPS 206 to generate a document in a single pass of a charge retentive surface in the form of photoreceptor belt 212. Furthermore, print engine 210 is shown as comprising a laser based raster output scanning device (ROS) 214 as a light source, although it is to be understood that other light sources, for example an LED printbar, might be used. Briefly, photoreceptor 212 is uniformly charged as it passes charging station 216 which may comprise, for example, a corona generating device. The uniformly charged photoreceptor 212 then passes ROS 214 which exposes the photoreceptor in response to image data from IPS 206 thereby forming an electrostatic latent image on the photoreceptor. The electrostatic latent image is then developed with toner at developing station 218 to produce a toner image on belt 212. The toner image is then transferred to a print media (not shown) at a transfer station 220. After transfer, the image is fused to the print media.

It will be apparent to those of ordinary skill in the art that the print engine shown may be modified to generate a color document. For example, by adding successive charging, exposure, and developing stations, a recharge, expose, and develop image on image process can be implemented such that the print engine can produce a color document in a single pass of the photoreceptor. Similarly, the print engine may comprise a single ROS and several developing stations, each having a different color toner. With such a system the print engine can produce a color document using several passes of the photoreceptor through the ROS and charging station wherein each pass is developed at a different developing station.

The present invention is directed towards aspects of image processing system 206 depicted in FIG. 13. In particular, the present invention is directed to a system for processing of segmentation tags to reduce segmentation artifacts. The present invention proposes a system comprising one or more of the three segmentation tag processors, a block tag generator, a block tag cleaner and a pixel tag cleaner, to process the segmentation tags. The segmentation tag processors can be used alone or in combination with either one or both of the other segmentation tag processors to reduce the segmentation artifacts.

In general, the block tag generator identifies a block of segmentation tags, compiles statistics for segmentation tags within the identified block and generates a block level tag for the identified block of segmentation tags based upon the compiled statistics. The block level tag identifies a representative segmentation tag or tags for the segmentation tags within the identified block. The block tag generator can operate on either a block of pixel level segmentation tags or a block of block level segmentation tags.

The block tag cleaner operates to clean segmentation tags based on a group of neighboring segmentation tags. In a first embodiment, the block tag cleaner uses morphological operations combined with heuristic rules to clean segmentation tags based upon blocks of neighboring segmentation tags. More, specifically, after a segmentation tag to be cleaned is identified, a predefined block of neighboring segmentation tags is identified. One or more predictions are made from the neighboring tags and a cleaned tag is generated based upon the predictions.

In a second embodiment of a block tag cleaner, segmentation tags are cleaned by statistically analyzing connected components of segmentation tags. In this embodiment weakly connected segmentation tags are eliminated from a set of segmentation tags and connected components are identified from the remaining segmentation tags. Tag statistics are collected for each of the connected components and a representative segmentation tag is assigned to each connected component based on the collected statistics and a set of predetermined rules.

The pixel tag cleaner operates on pixel level segmentation tags to modify pixel level segmentation tags based upon a window of neighboring segmentation tags. The knowledge of the neighboring segmentation tags aids in making an intelligent decision regarding the value of a pixel level tag. Beneficially, the pixel tag cleaner bases the decision to modify a pixel level tag based on neighboring block level tags such as are available from a block tag generator or a block tag cleaner. Basing the decision to modify a pixel level tag on neighboring block level tags avoids "blocky" looking classification and retains the original contours of the segmentation map. However, it is understood that the pixel tag cleaner may clean pixel level tags based upon a window of neighboring pixel level segmentation tags.

Figure 1:
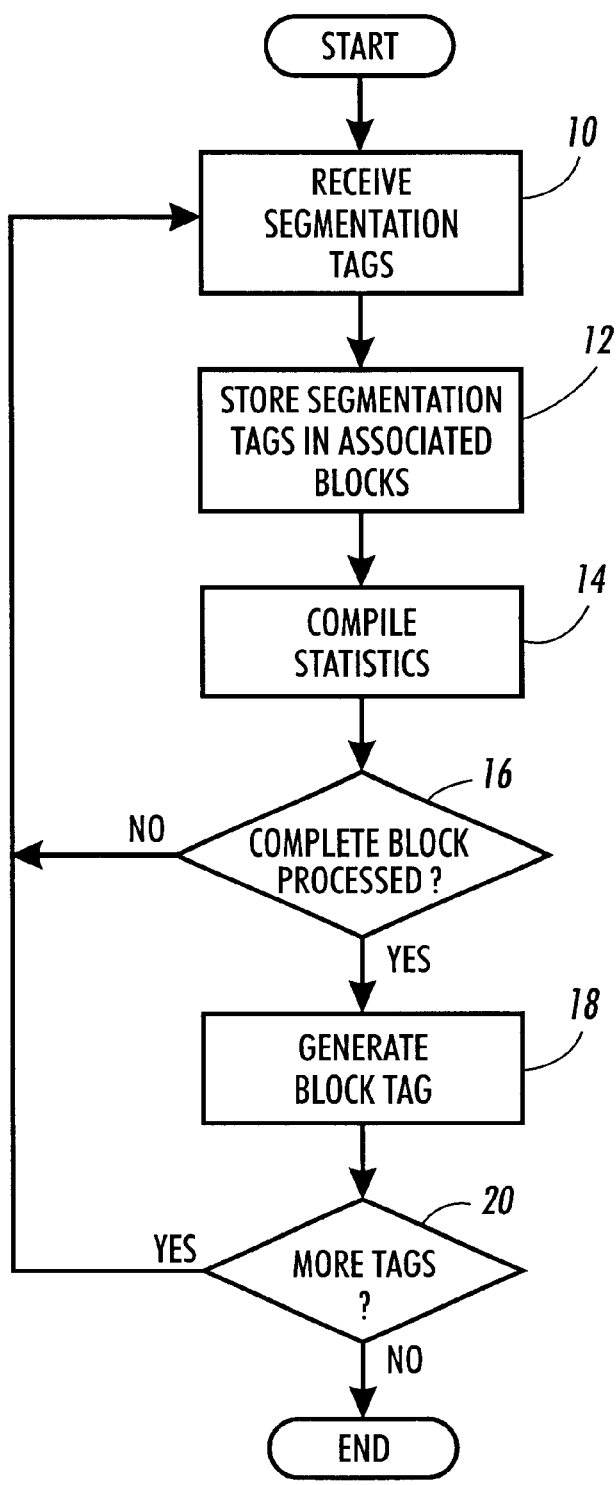
FIG. 1 is a flow chart illustrating various steps in an embodiment of a method for generating a block level tag.

Having briefly described the operation of each of the three segmentation tag processors available for use in a system for processing segmentation tags, attention is now turned to a more detailed discussion of the operation of each segmentation tag processor. Referring to FIG. 1, there is shown a flow chart illustrating various steps in the generation of a block level tag and a representation of the operation of a block tag generator. As depicted in FIG. 1, the generation of a block level tag begins at step 10 with the receipt of a segmentation tag. As noted above, the block tag generator generates a block level tag based upon statistics for the segmentation tags within the block. To compile the statistics for a given block, the segmentation tags that comprise the block of tags must be identified.

The identification of a block of segmentation tags can be accomplished using a windowing technique wherein the received segmentation tags are stored in a buffer and, when a sufficient number of segmentation tags have been stored, a block of tags is selected from the buffer for examination and compilation of statistics. However, such windowing techniques can require a large amount of storage for buffering the received segmentation tags. To reduce the buffering of segmentation tags, the block tag generator can identify a block of segmentation tags by assigning segmentation tags to a block as the tags are received. At step 12, as the segmentation tags are received, the block tag generator stores the segmentation tag in its associated block. In general, step 12 may store a segmentation tag in a given block using a look-up table, a counter, an address generation circuit or any other similar or equivalent method.

Next, as indicated at step 14, the block tag generator compiles statistics for the segmentation tags within a block of tags. The statistics compiled at step 14 are used to determine a representative segmentation tag, or block level tag, for the block. As the segmentation tags are assigned to a block of tags, step 14 incorporates the segmentation tag into any previously compiled statistics for the block of tags to which the segmentation tag is assigned. Beneficially, every segmentation tag within the block is included when compiling segmentation tag statistics. However, it should be appreciated that the tag statistics may be compiled from less than all the segmentation tags. For example, if the hardware and/or software performing the statistics compilation cannot keep up with the data rate, a sub-sampling of the segmentation tags within the block may be used to compile statistics.

The determination of a block level tag can be based upon any statistic or similar information derived from the segmentation tags within the block. For example, possible statistics which may be compiled include the number of occurrences of each different value of segmentation tag within the block, the frequency distribution of each of the different segmentation tag value, the predominate segmentation tag value, and a weighted count of segmentation tag values. The value of a segmentation tag indicates the image class or image classification that is identified or represented by the segmentation tag. It will be appreciated that those skilled in the art may recognize alternative statistics may be employed to generate a block level tag.

At step 16 a determination is made as to whether all the segmentation tags for a given block have been processed. If not, the process loops back to step 10 to receive more segmentation tags. If a complete block has been processed, then a block level tag is generated at step 18. Next, at step 20, the process loops back to step 10 if there are more segmentation tags to process. The process ends when no further segmentation tags need processing.

As described above, a block level tag can be based upon any statistic chosen to be compiled from the segmentation tags. Beneficially, the block tag generator identifies the predominant tag (Tm) and the second most predominant tag, (Tm−1) within each block and generates the block level tag based upon those tags. It has been found that providing the most predominant tag (Tm) as the block level tag provides good results. However, it is understood that, based upon the various image classes represented by the segmentation tags, it may be advantageous to provide a block level tag identifying both Tm and Tm−1 or to generate the block level tag as a function of Tm and Tm−1.

Given a set of segmentation tags comprising the following image classes: smooth contone, rough contone, low frequency halftones, fuzzy (or intermediate) low frequency halftones, fuzzy (or intermediate) high frequency halftones, high frequency halftones, text, and background, situations arise where it may be advantageous to generate a block level tag as a function of Tm and Tm−1. For example, it may be appreciated that if Tm is a fuzzy or intermediate frequency halftone and Tm−1 is a low frequency or high frequency halftone the block level tag may be set to the second most predominant tag Tm−1 rather than the most predominant tag Tm. One possible set of rules for generating the block level tag (BT) as a function of Tm and Tm−1 given the set of image classes above can be described by the following C-like programming statement:

```
If ((Tm = FUZZY LOW) OR (Tm = FUZZY HIGH))
{
      if (Tm-1 = LOW FREQ)         BT = LOW FREQ
      else if (Tm-1 = HIGH FREQ)   BT = HIGH FREQ
}
else if ((Tm = SMOOTH CONTONE) OR (Tm = HIGH FREQ))
{
      if (Tm-1 = BACKGROUND)       BT = BACKGROUND
}
else if (Tm = ROUGH CONTONE)
{
      if (Tm-1 = LOW FREQ)         BT = LOW FREQ
}
else
{
      BT = Tm
}
```

It is understood that the above set of rules is provided by way of example to illustrate the generation of a block level tag as a function of one or more predominant tags, and one skilled in the art may identify different rules for generating a block level tag. Additionally, the block tag generator may provide both Tm and Tm−1 which are then used by a block tag cleaner or pixel tag cleaner. Furthermore, it is understood that the set of image classes is shown as an example, and one skilled in the art may retain other combinations of image classes as well as a different number of classes.

In summary, the method of generating block level tags illustrated in FIG. 1, begins with the receipt of a segmentation tag at step 10. At step 12, the received segmentation tag is assigned to a block of tags. Next, at step 14, the tag is included in statistics compiled for the block of tags to which the received segmentation tag is assigned. Steps 10, 12 and 14 are repeated until statistics have been compiled for all the selected segmentation tags within a block. When the compilation of statistics for a block is completed, the process generates a block level tag at step 18. The above steps can be repeated until all the segmentation tags have been received. Beneficially, the block tag generation process operates on pixel level segmentation tags such as are available from an auto-segmentation processor to generate a block level tag representative of the block of pixel level segmentation tags. However, it is understood that the process represented by FIG. 1 can be used to generate a block level tag representative of a block which itself comprises block level tags.

Figure 2:
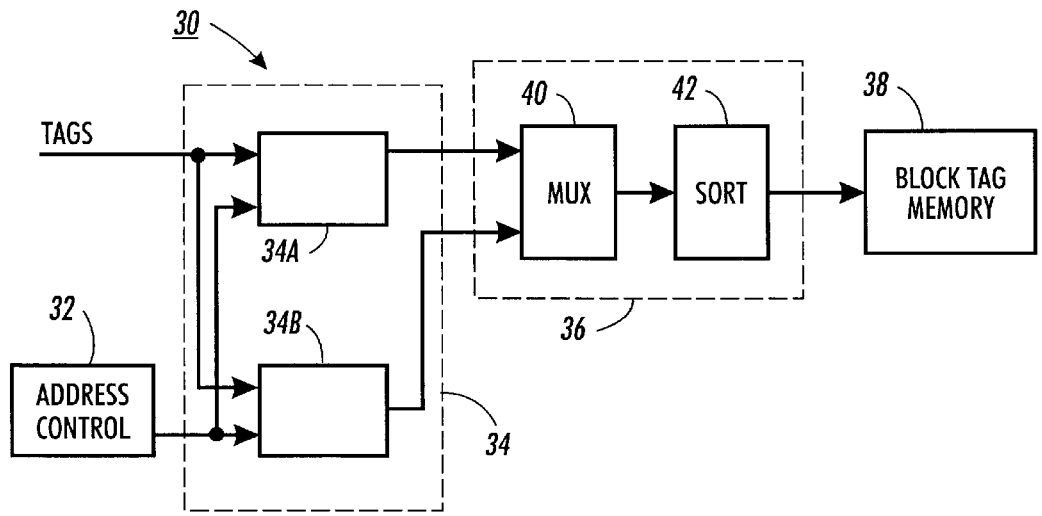
FIG. 2 schematically illustrates an embodiment of a block tag generator in accordance with the present invention.

Having generally described a method for generating block level tags, attention is now turned to a discussion of an embodiment of a block tag generator in accordance with the present invention. Referring to FIG. 2, there is shown a block diagram of an embodiment of a block tag generator 30. Block tag generator 30 comprises four functional modules: address controller 32, statistics compilation module 34, tag sorting circuit 36 and block tag memory 38.

More specifically, statistics compilation module 34 comprises a number of separate sub-modules (e.g., compilation circuits 34A and 34B), which receive segmentation tags. Each compilation circuit 34A and 34B operates on the received segmentation tags to compile statistics for blocks of segmentation tags. Address controller 32 which can comprise a modulus counter, an accumulator, a look-up table, or the like selects the appropriate compilation circuit 34A or 34B within statistics compilation module 34 to receive each segmentation tag. The statistics compiled at module 34 are coupled to tag sorting circuit 36 where the statistics are sorted on a per block basis and a final block tag is generated. The final block level tag is then written to block tag memory 38 from which the block level tags can be retrieved for use by other processors.

The operation of block tag generator 30 of FIG. 2, will be explained in further detail with reference to the processing of M×N blocks of segmentation tags to generate a block level tag based upon a function of the most predominant (Tm) and the second most predominant (Tm−1) segmentation tag value within the block. It should be understood that block tag generator 30 is not limited to this operation and can be used to process blocks of varying shapes and/or blocks arranged at any angle and to generate block tags based upon any number of compiled statistics.

In operation, address controller 32 selects one of the computation circuits, e.g., circuit 34A, to receive tags. Each compilation circuit 34A and 34B which may comprise a block of histogram memory, an accumulator, a counter or the like collects statistics for one row of blocks. The number of blocks per row depends upon several factors including the values of M and N, the resolution of the segmentation tags, and the size of the input image. For example, using M×N blocks of pixel level segmentation tags where M and N are selected to be 50 and 75 and a scanner with a scan resolution of 400×600 dpi, each row comprises, in the case of a 12.4"×17" image, approximately 100 blocks (12.4×400/50≈100). After every M segmentation tags, either address generator 32 or compilation circuit 34A indicate that the next tag received belongs to a new block. The process repeats for N rows. At the end of N rows, address generator 32 begins coupling the incoming segmentation tags to compilation circuit 34B.

At the end of N rows, compilation circuit 34A would contain for each block in the row a set of statistics that identifies the number of occurrences of each tag value within the block. The statistics compiled by circuit 34A are read out by sorting module 36. In sorting module 36, multiplexer 40 routes the statistics to sorter 42 where the statistics are sorted on a per block basis. Sorter 42 identifies Tm and Tm−1 and generates a block level tag based upon a set of rules. The final block level tag for each block is then written to block tag memory 38.

Block tag generator 30 can embody or be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Specific algorithms may be accomplished using software in combination with hardware. In general, any device capable of implementing a finite state machine that is capable of implementing the block tag generation process described above can be used to realize a block tag generator.

Figure 3:
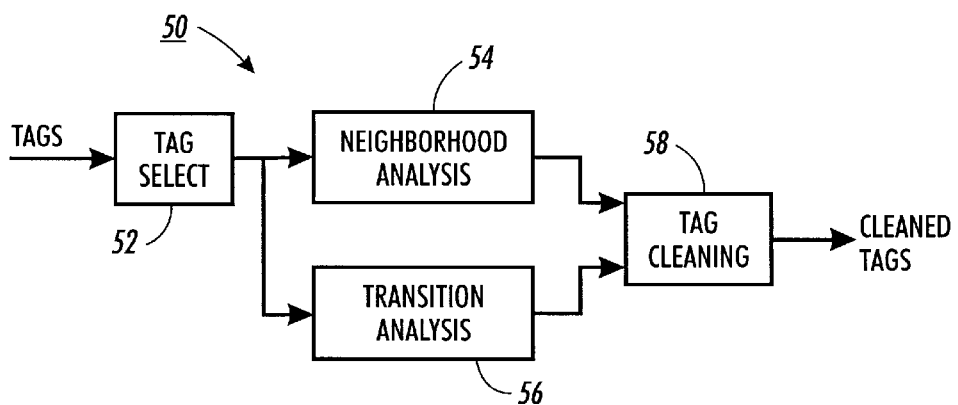
FIG. 3 is a block diagram of an embodiment of a block tag cleaner in accordance with the present invention.

Referring now to FIG. 3, there is shown a diagram illustrating the data flow through a first embodiment of block tag cleaner 50 in accordance with the present invention. In the embodiment of FIG. 3, segmentation tags are cleaned (processed) by block tag cleaner 50 using morphological operations combined with heuristic rules designed to reduce abrupt switching of tags by discouraging any switching until there is a level of certainty that a change is needed.

Figure 4:
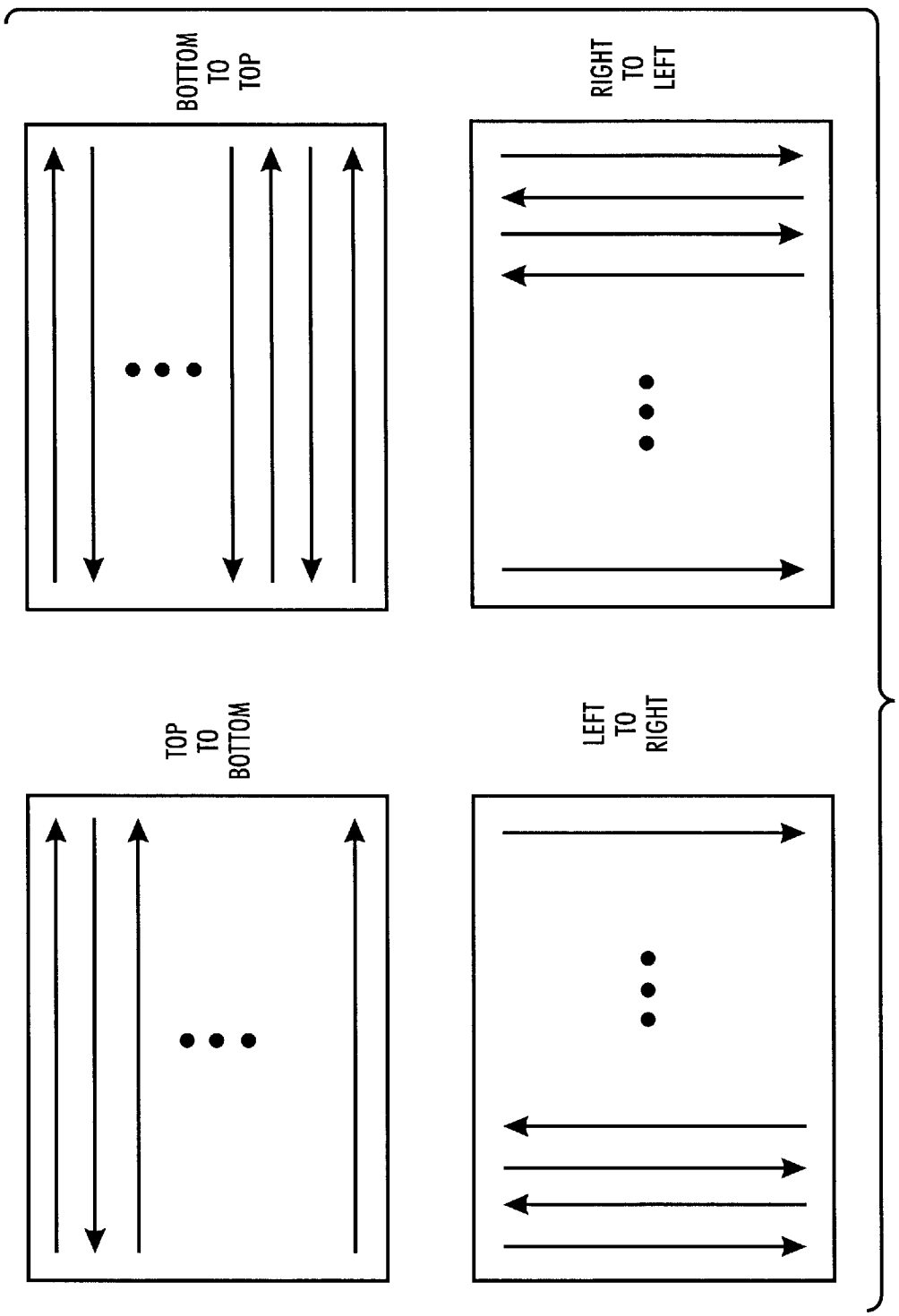
FIG. 4 illustrates various paths for sequentially stepping through a set of segmentation tags.

In block tag cleaner 50, segmentation tags are coupled to tag identification module 52. Optionally, block tag cleaner 50 can include tag buffer (not shown) that receives and buffers the segmentation tags. Tag identification module 52 identifies a current segmentation tag to be cleaned. Beneficially, when identifying the current tag to be cleaned, module 52 sequentially steps through successive segmentation tags moving from one edge of the image to the opposite edge. For example, FIG. 4 illustrates four possible paths (top to bottom, bottom to top, left to right and right to left) to follow when sequentially stepping through successive segmentation tags to identify the current tag to be cleaned. It should be appreciated that a block tag cleaner is not limited to sequentially stepping through the tags along one of the paths shown in FIG. 4. Furthermore, it should be appreciated that is not even limited to sequentially stepping through the tags.

After identifying the current segmentation tag to be cleaned, module 52 passes the current tag to neighborhood analysis module 54 and transition analysis module 56. Neighborhood analysis module 54 retrieves a group of segmentation tags neighboring (e.g., adjacent to or near) the current tag to generate a neighborhood block having a predefined size, shape and location relative to the current tag. Beneficially, the neighborhood block comprises a square block (i.e., X×X) centered on the current tag. Although, it should be appreciated that neighborhood blocks having different sizes and shapes may be employed in the practice of the present invention and that the neighborhood block need not be centered on the current tag.

After identification of the neighborhood block, module 54 analyzes the segmentation tags within the neighborhood block and, based upon the analysis, generates one or more neighborhood block tag predictions. Each neighborhood block tag prediction identifies a segmentation tag value or values that, based upon an analysis of neighboring tags, could exist at the current tag. Neighborhood block tag predictions can be based on any analysis of set of neighboring tags and can include factors such as the location of a segmentation tag within the neighborhood block with respect to that of the current tag and whether a segmentation tag has been cleaned.

Examples of possible neighborhood block predictions will be described with reference to FIG. 5 in which is shown a sample neighborhood block 60 comprising a 5×5 block of segmentation tags centered upon current tag (x13). Assuming the block tag cleaner is stepping through segmentation tags along a path from top to bottom, such as is shown in FIG. 4, in a pass from left to right tags x1 through x12 will have been cleaned. One possible analysis of the segmentation tags within the neighborhood block to generate a neighborhood block tag prediction builds a frequency table for the segmentation tags within the block. A frequency table identifies the number of occurrences of each tag value within the block. When generating a frequency table, the segmentation tags may be weighted based upon their location, tag value and/or their status (i.e., previously cleaned). For example, assuming the segmentation tags in neighborhood block 60 have the following values:

| B | A | A | C | C |
|---|---|---|---|---|
| A | B | C | C | C |
| D | D | E | E | F |
| A | A | E | E | E |
| A | B | E | E | E | wherein the 25 segmentation tags can be identified x1, x2, . . . , x25 and are positioned/oriented as shown in FIG. 5. Generating a frequency table wherein cleaned tags are weighted 2 and the remaining tags are weighted 1 provides a frequency table of: [A:9, B:5, C:10, D:4, E:8, F:1]. Similarly, another weighting scheme may weight cleaned, adjacent tags 2.5, cleaned, nonadjacent tags 2, adjacent tags (not cleaned) 1.5 and the remaining tags 1 to provide a frequency table of: [A:9.5, B:5.5, C:11, D:4.5, E:9.5, F:1]. Weighting a tag based upon its value might, for example, reduce the weight of a tag in half for specific image classes.

After generating the frequency table, any criteria may be used to select a neighborhood block tag prediction from the table. One criterion that may be used to select the block tag prediction is the most predominant tag in the table, resulting in a predicted tag value of C for both weighting schemes. Another possible criterion may identify any tag value having more than predetermined percent of the total weighted occurrences. For example, in the first weighting scheme there are 34 weighted occurrences. If the block tag prediction identifies those tag values having at least 25 percent of the weighted occurrences (that is, more than 8.5), the block tag prediction would identify tag values A and C as the neighborhood block tag prediction.

Similarly, transition analysis module 56 identifies a group of segmentation tags to generate a block of transitioning segmentation tags (transition block) having a predefined size, shape and location with respect to the current tag. Module 56 analyzes the segmentation tags within the transition block and, based upon the analysis, generates one or more transition block tag predictions for the current tag. Each transition block tag prediction identifies one or more predicted tag values for the current tag based on the presumption that the current tag is transitioning into or out of a different image region.

The size, shape and location of the transition block will generally depend on the size, shape and location of the neighborhood block and whether the transition block tag prediction identifies a transition into or out of an image area. For example, if the transition block tag prediction is based upon a transition into an image region, the transition block may include segmentation tags from the image region into which the current tag may be transitioning. One possible transition block 62, as it relates to the neighborhood block 60 of FIG. 5, is shown in FIG. 6. In FIG. 6, neighborhood block 60 is shown in dotted line and transition block 62, identifying an area into which the current tag is transitioning, is shown comprising a 5×5 block of segmentation tags with current tag x13 in the upper left corner.

The transition block tag prediction can be based upon any analysis of the tags within the transition block. In general, it has been found that generating a transition block prediction based upon a frequency table for the segmentation tags within the block provides good results. As with the generation of a neighborhood block prediction, the segmentation tags may be weighted based upon their location relative to the current tag, their value and/or their status.

The tag predictions from modules 54 and 56 are passed to tag cleaning module 58 which generates a cleaned current tag based upon the tag predictions. The tag predictions are used primarily to confirm the current tag value rather than to reset the current tag. Typically, the tag predictions will used to modify the current tag only if the current tag does not match any of the predictions. In general, if any of the neighborhood block tag predictions are the same as the current tag, the current tag is presumed correct and is left untouched. If the current tag does not match any of the neighboring tag predictions, the current tag is compared to the transition block tag prediction. If the transition block tag prediction matches the current tag, the current tag is presumed to be transitioning into a different region and is left untouched. If current tag does not match any of the tag predictions, the current tag may be misclassified and is replaced with tag based upon the neighborhood block tag prediction, the transition block tag prediction, and the current tag.

Block tag cleaner 50 can embody or be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Furthermore, specific algorithms may be accomplished using software in combination with specific hardware. In general, any device capable of implementing a finite state machine that is capable of implementing the block tag cleaning process described can be used to realize block tag cleaner 50.

Figure 7:
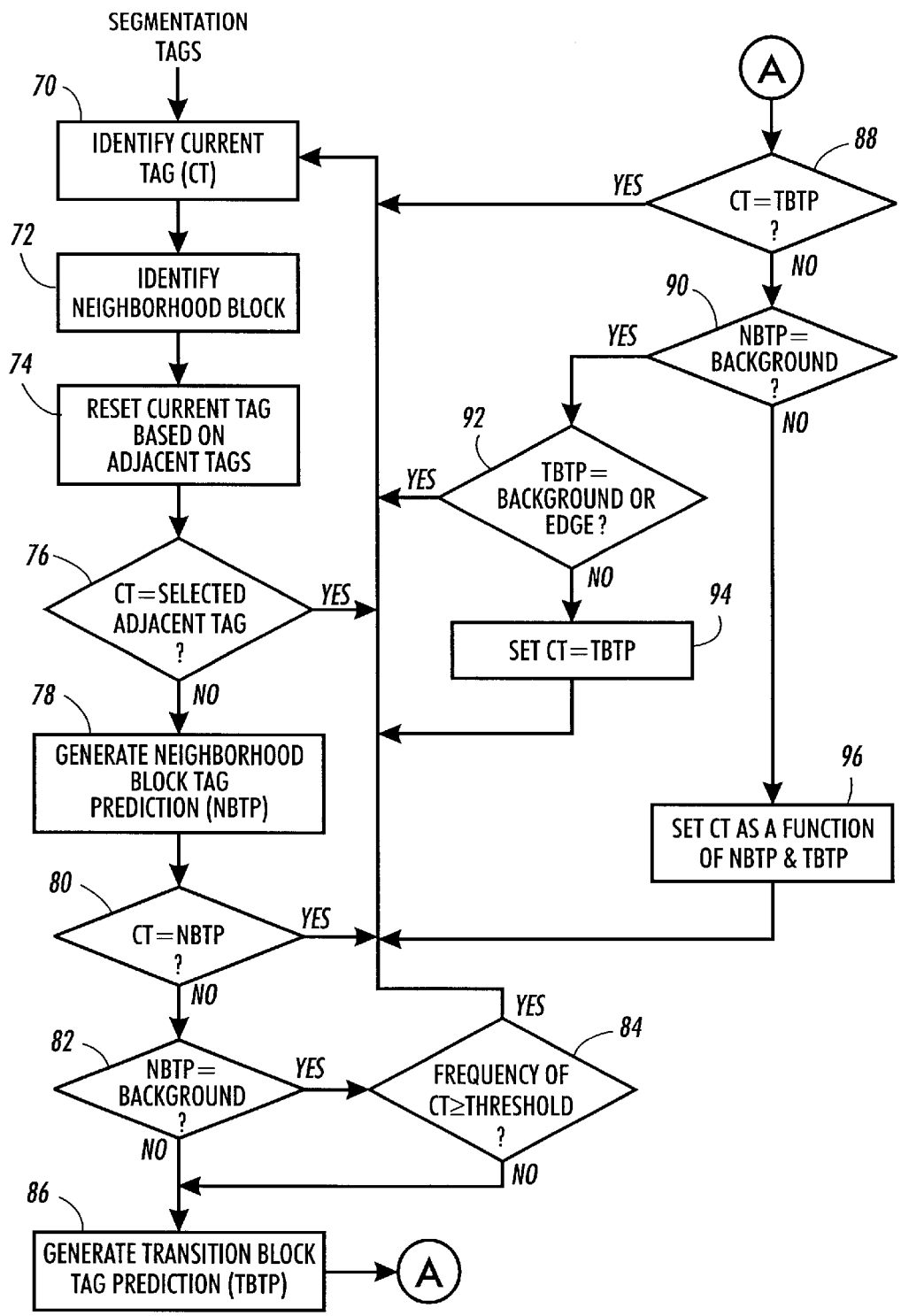
FIG. 7 illustrates an embodiment of a block tag cleaning method in accordance with the present invention.

Having generally described an architecture for a block tag cleaner, attention is now turned to a discussion of an embodiment of a method for cleaning segmentation tags in accordance with the present invention. Referring now to FIG. 7, there is shown a schematic illustration of various steps performed in cleaning segmentation tags in accordance with an embodiment of a block tag cleaner and an alternate representation of the operation and data flow through block tag cleaner 50 of FIG. 3.

In FIG. 7 step 70 receives segmentation tags and identifies a current tag to be cleaned. Next, at step 72, one or more segmentation tags neighboring the current tag are identified. The neighboring segmentation tags identified at step 72 along with the current tag comprise a neighborhood block. As previously described, the neighborhood block beneficially comprises a square block centered on the current tag. After identifying the neighborhood block, the clean up operation for the current tag begins.

Initially, at step 74 the current tag may be reset as a function of the segmentation tags adjacent to the current tag. More specifically, for a given set of segmentation tags, it may be advantageous to override the current tag based upon the adjacent tags. For example, if the current tag is represents an image class of intermediate frequency halftone, the current tag may be set to represent a high frequency halftone if a majority of the adjacent tags also represent high frequency halftones. Similarly, a current tag is that represents an image class of intermediate frequency halftone may be reset to represent a low frequency halftone if more adjacent tags represent low frequency halftones than represent high frequency halftones. In another example, a tag representing an image class of edge may be reset to represent a low frequency halftone if one or more of the adjacent tags have a value that represents low frequency halftone. It is appreciated that those skilled in the art will recognize that additional or alternative conditions exist in which it may be desirable or advantageous to override the current tag.

At step 76, the current tag is compared to one or more segmentation tags adjacent to the current tag. A segmentation tag is adjacent to another when there are no other segmentation tags between them. If the segmentation tags are rectangular and arranged in rows and columns, each tag may have up to eight neighbors. Other criteria (e.g., cleaned adjacent, horizontal adjacent, cleaned, vertical adjacent) can be used to reduce the number of segmentation tags to which the current tag is compared. If the tag is the same as at least one of the adjacent tags to which it is compared, then the current tag is presumed to be correct and the cleanup operation for the current tag is completed. If the current tag does not match any of the adjacent tags to which it is compared, then the cleanup operation continues at step 78.

In step 78 the current tag and the segmentation tags within the neighborhood block are analyzed to generate one or more neighborhood block tag predictions such as are described above. At step 80, the current tag is compared to the neighborhood block tag prediction(s) generated at step 78. If the current tag is the same as the neighborhood block tag prediction, the current tag is presumed to be correct and processing for the current tag is completed. If the current tag is not the same, then the cleanup operation continues at step 82.

At step 82, the neighborhood block tag prediction is compared to a segmentation tag value representing the document background or similar image classification for the scanned document. A document background classification may be preselected for all scanned documents or determined for each document scanned by, for example, identifying the predominate image class in the first few scanlines along the leading edge of a scanned document. If the neighborhood block tag prediction is the same as the document background, the total number of (weighted) occurrences of the current tag value within the neighborhood block is compared to a threshold at step 84. If the number of (weighted) occurrences is greater than the threshold, it is presumed that the current tag is transitioning from the background class, and cleanup of the current tag complete. The threshold can be set to any number of occurrences or a percent of total occurrences.

On the other hand, if either the neighborhood block tag prediction is not the same as the background class or the number of (weighted) occurrences for that tag value is not greater than a threshold, the process continues with step 86. At step 86, a transition block is identified and the segmentation tags within the transition block are analyzed to generate one or more transition block tag predictions. After generating one or more transition block tag predictions as described above, the process compares the current tag to the transition block tag prediction at step 88. If the current tag is the same as the transition block tag prediction, the current tag is presumed to be transitioning into a new image area and the processing of the current tag is complete. If the current tag is not the same, then the current tag may be misclassified and the cleanup operation continues with steps 90 to 96 wherein the current tag is replaced with tag based upon the neighborhood block tag prediction, the transition block tag prediction, and the current tag.

At step 90, the neighborhood block tag prediction is compared to a segmentation tag value representing the document background. If the neighborhood block tag prediction matches a document background tag value at step 90, the process continues with step 92. In reaching step 92, the current tag is presumed to be transitioning from a background classification. However, the current tag does not match the transition block tag prediction or have a great enough (weighted) frequency (step 84) in the neighborhood block and thus is presumed to be to misclassified. The current tag will be replaced with the transition block tag prediction if the transition prediction is a proper replacement.

At step 92, the process determines whether the transition block tag prediction can be used to replace the current tag. If so, at step 94, the current tag is replaced with the transition block tag prediction; otherwise, the current tag is untouched. More specifically, step 92 applies a set of rules to determine if it is appropriate to replace the current tag. The rules can be based upon a number of factors including, but not limited to, tag priority and tag frequency. As an illustrative example, a set of rules may indicate (1) that a transition block tag prediction having a value that represents an image class of background or edge cannot be used to replace a current tag and (2) that a transition block tag prediction having any other value will replace the current tag if the frequency of the current tag is below a first threshold and/or the frequency of the transition block tag prediction is above a second threshold. It is appreciated that those skilled in the art will recognize that additional or alternative rules may be employed in determining whether a transition block tag prediction may replace the current tag.

If the current tag is not equal to the transition block tag prediction at step 88 and the neighborhood block tag prediction does have not a tag value that represents the document background at step 90, the process generates a cleaned current tag based on the current tag, the neighborhood block tag prediction and the transition block tag prediction at step 96. One possible function sets the current tag to equal the neighborhood block tag prediction as long as the neighborhood block tag prediction does not equal a predetermined image class such as background or edge.

In general, when cleaning segmentation tags to reduce segmentation artifacts, the tag cleanup operation will beneficially clean each segmentation tag once. However, a multi-level cleanup operation can be performed by passing cleaned tags through the cleanup operation several times. Each successive cleanup operation could be performed following a path as shown in FIG. 4 to eliminate any bias due to unidirectional cleanup. Additionally, it is understood that processing limitations may require that only a subset of the segmentation tags be cleaned.

Figure 8:
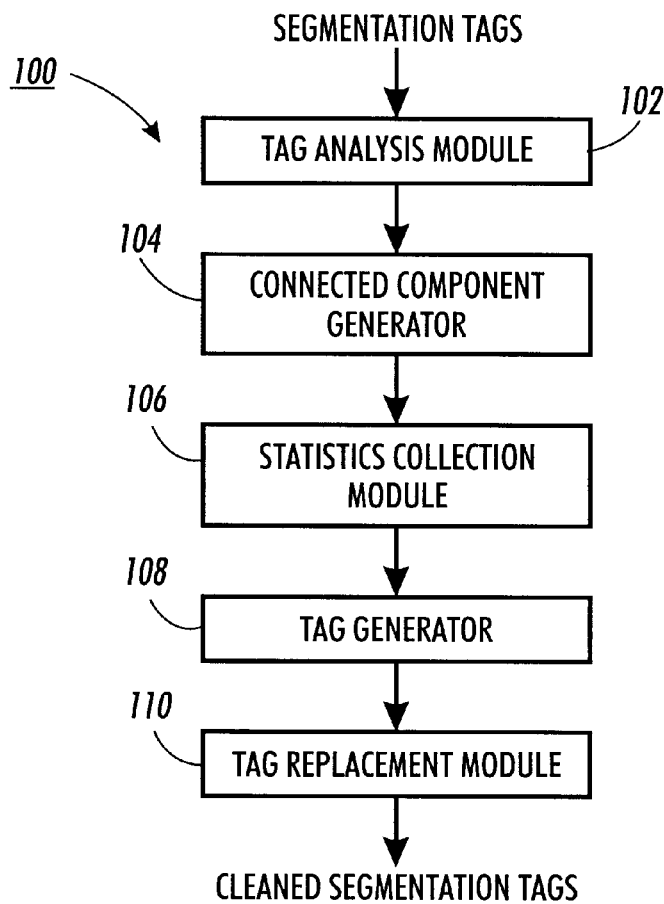
FIG. 8 schematically illustrates an embodiment of a block tag cleaner in accordance with the present invention.

Referring now to FIG. 8 there is shown block diagram depicting the data flow through a second embodiment of block tag cleaner 100 in accordance with the present invention. In the embodiment of FIG. 8, segmentation tags are cleaned by block tag cleaner 100 using a statistical analysis of connected components. Block tag cleaner 100 can embody or be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Furthermore, specific algorithms may be accomplished using software in combination with specific hardware. In general, any device capable of implementing a finite state machine that is in turn capable of implementing the block tag cleaning process described below can be used to realize block tag cleaner 100.

In block tag cleaner 100, segmentation tags are coupled to tags analysis module 102. Tag analysis module 102 receives a plurality of segmentation tags and identifies weakly connected segmentation tags within the plurality of tags. Tag analysis module 102 identifies weakly connected segmentation tags as those segmentation tags that are not the same as or are not similar to a sufficient number of adjacent segmentation tags. Additionally, module 102 may identify a particular tag as a weakly connected tag if the number of neighboring segmentation tags indicating a predefined image type, such as background, exceeds a certain threshold. After identifying a weakly connected tag, module 102 eliminates the weakly connected tag from further processing by replacing the tag value with a value indicating a preselected image type such as background. Alternatively, module 102 can eliminate a weakly connected tag by marking the weakly connected tag in such a way that the tag can be identified as being a weakly connected tag in a subsequent processing operation.

After the weakly connected segmentation tags within the plurality of tags have been identified, connected component generator 104 identifies the connected components. A set of segmentation tags comprise a "connected component" if each segmentation tag within the set is adjacent to at least one segmentation tag that is in the set and if each pair of segmentation tags in the set are connected by a subset of other tags in the set.

The process for identifying connected components within the plurality of segmentation tags can be described by way of example. Assuming module 102 eliminates weakly connected segmentation tags by replacing such tags with an image type of background, generator 104 simply locates a non-background segmentation tag as a first connected tag. Once a connected (background) segmentation tag is found an iterative process locates all the non-background segmentation tags adjacent to the connected tag, and their adjacent connected tags, and so on, until the extent of the connected tags is determined. This process is repeated until all non-background segmentation tags have been properly associated with a connected component. Similarly, if module 102 marks a segmentation tag as being weakly connected, the process simply identifies an unmarked tag as a first connected tag and continues to identify all the adjacent unmarked tags until the extent of the connected component is known.

It should be noted that the possibility exists where generator 104 identifies a connected component which contains a region comprising a small number of weakly connected tags (e.g., background or marked) within the confines of the connected component. These regions will be merged into the connected component if the size of the region is sufficiently small. The determination of whether the size of a region is small can be based on a number of factors including the number of weakly connected tags within the region, the percentage of the connected component comprised by the region, etc.

After identifying the connected components at generator 104, block tag cleaner 100 generates a representative tag for each connected component based upon collected statistics and a predefined set of heuristic rules at modules 106 and 108. The generation of a representative tag for each connected component is similar to the generation of block level tags as described above with reference to FIGS. 1 and 2. That is, the connected components identified at generator 104 are passed to statistics collection module 106 wherein tag statistics for each connected component are collected. Module 106 can collect any desired statistics from which a representative tag for the connected component can be identified. Beneficially, module 106 collects tag statistics sufficient to identify the most predominant tag value and the second most predominant tag value within each connected component.

Using the collected tag statistics, tag generator 108 identifies a representative tag for each connected component. The representative tag generated for each connected component identifies a segmentation tag value or values based upon the collected statistics and a predefined set of heuristic rules. One possible set of rules for generating a representative tag based upon the most predominant tag value and the second most predominant tag value was previously described with reference to FIG. 1. A representative tag could also be identified based on the segmentation tag histogram distribution or some heuristic image quality requirements such as masking segmentation defects. After generation of a representative tag for a connected component by generator 108, tag replacement module 110 replaces selected segmentation tags within the connected component with a cleaned segmentation tag generated as a function of the representative tag and the value of the selected tag. One such function simply replaces each segmentation tag within the connected component with the representative tag.

Figure 9:
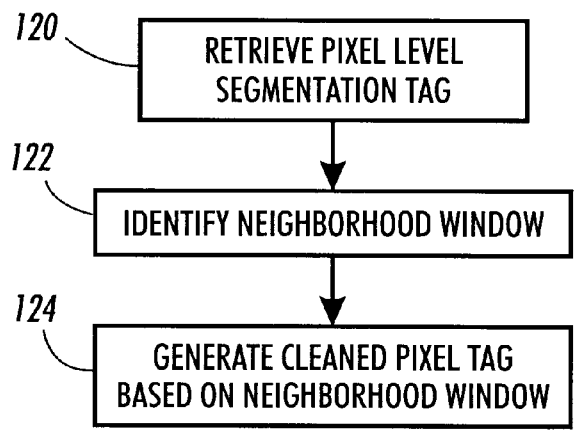
FIG. 9 is a block diagram of an embodiment of a pixel tag cleaner in accordance with the present invention.

Referring now to FIG. 9 there is shown a block diagram depicting the data flow through an embodiment of a pixel tag cleaner in accordance with the present invention. As stated above, the pixel tag cleaner operates on pixel level segmentation tags to generate cleaned pixel level segmentation tags based upon a window of neighboring segmentation tags. As shown in FIG. 9, pixel tag cleaner receives a current pixel level segmentation tag to be cleaned at module 120. Next, at module 122, the pixel tag cleaner identifies a neighborhood window comprising a group of segmentation tags neighboring the current pixel level tag.

The knowledge of the neighboring segmentation tags aids in making an intelligent decision regarding the value of a pixel level tag. Beneficially, the pixel tag cleaner bases the decision to modify a pixel level tag on neighboring block level tags such as are available from a block tag generator or a block tag cleaner. However, it is understood that the pixel tag cleaner may clean pixel level tags based upon a window of neighboring pixel level segmentation tags. When identifying a window of neighboring segmentation tags, module 122 beneficially identifies a neighborhood window of segmentation tags centered on a segmentation tag associated with the current pixel level tag. When using a neighborhood window comprising block level segmentation tags, the window is beneficially centered on a block in which the current segmentation tag resides.

After identification of the neighboring window, the pixel tag cleaner cleans the current pixel level tag at module 124 to generate a cleaned pixel level tag. In general, if the neighborhood window comprises block level segmentation tags, the current pixel level tag is compared to the block level tag for the block in which the current pixel resides. If the current pixel level tag is the same as the current block tag, the pixel level tag is presumed to be correct and left untouched. If the neighborhood window comprises pixel level segmentation tags or, if the window comprises block level tags, the pixel level tag is not the same as the current block tag, the current pixel level tag is compared to segmentation tags comprising the neighborhood window. If the current pixel level tag is the same as a threshold number of the neighboring segmentation tags, the pixel level tag is presumed to be transitioning and, again, left untouched. If the pixel level tag is not the same as either the current block tag or one of the neighboring segmentation tags, the current pixel level tag typically will be replaced with a segmentation tag generated as a function of the neighboring segmentation tags. When the neighborhood window comprises block level tags, the current pixel level tag is typically replaced with the current block tag to generate the cleaned pixel level tag. However, it should be appreciated that in certain situations, it may not be desirable to replace the current pixel level tag with the block level tag. For example, if the current block level tag identifies an image class of background, it may not be desirable to replace the current pixel level tag with a tag identifying an image class of background. Similarly, if the current block level tag identifies an image class of intermediate (or fuzzy) frequency halftone, it might not be desirable to replace a current pixel level tag of low or high frequency halftone.

One image class for which it may be desirable to provide an exception to the general process outlined above is the edge class. That is, for pixel level tags identifying an image class of edge, it is generally desirable for the pixel level tag to have priority over the block level tags. More specifically, a pixel level tag identifying an edge class will not replaced with a block level tag, except in the case of a block level tag of low frequency halftone which will replace a pixel level edge class.

Figure 10:
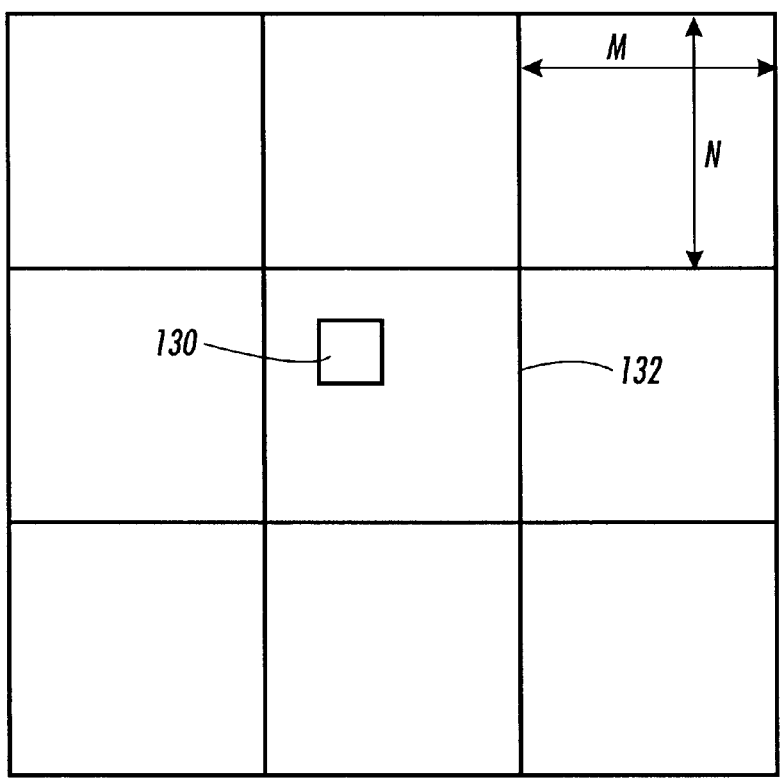
FIG. 10 illustrates an neighborhood window of segmentation tags employed by an embodiment of the present invention.

The operation of module 124 will be illustrated with reference to the cleaning of pixel level tags using a 3×3 neighborhood window of blocks centered on a block in which the current pixel level tag resides. The use of a 3×3 neighborhood window is illustrated in FIG. 10. In FIG. 10, the current pixel level tag 130 is shown as residing in block 132, referred to as the current block, that is surrounded by eight neighboring (adjacent) blocks. Beneficially, each of the blocks within the neighborhood window have the same size and orientation.

After identifying the neighborhood window, the pixel tag cleaner cleans the current pixel level tag. In cleaning pixel level tags, module 124 initially analyzes the neighborhood block to generate "temporary variables" used in comparing the current pixel level tag to the segmentation tags within the neighborhood window. These temporary variables may identify the frequency of each tag (image class) within the neighborhood window, whether any low frequency or high frequency halftones exist in the window or whether the neighborhood window has more high frequency or low frequency halftones.

The temporary variables will remain valid until the neighborhood window changes. That is, in operation the pixel tag cleaner retrieves a current pixel level tag to be cleaned. For each new pixel level tag to be cleaned, the pixel tag cleaner must identify a neighborhood window. Assuming that each block within the neighborhood window has a size of M×N segmentation tags, the neighborhood window remains the same for every M pixel level tags in the fastscan direction and N pixel tags in a slowscan direction.

After generating the temporary variables used in comparing the current pixel level tag to the segmentation tags within the neighborhood window, module 124 generates a cleaned pixel level tag based upon a set of predefined rules. In most cases, if the pixel level tag is the same as the current block tag or any of the eight neighboring block level tags, the tag is untouched. Otherwise, the current pixel level tag is replaced with the current block tag unless the current block tag identifies an image class of background wherein the current pixel level tag will remain unchanged. An exception to this general rule occurs for pixel level tags identifying an image class of edge which has a higher priority than several block level tags.

Given a set of segmentation tags comprising one or more of the following image classes: smooth contone (Scontone), rough contone (Rcontone), low frequency halftone (Low Freq), fuzzy or intermediate low frequency halftone (Fuzzy Low), fuzzy or intermediate high frequency halftone (Fuzzy High), high frequency halftone (High Freq), text, background and text on tint, the general predefined set of tag cleaning rules outlined above for generating a cleaned pixel level segmentation tag based upon a window of neighboring block level tags can be described by the following C-like programming statement:

```
if (freq[Low Freq] > 0)          LFHT = 1
if (freq[High Freq] > 0)         HFHT = 1
if (freq[Low Freq] >freq]High Freq)   maxL = 1
if ((freq[High Freq] > 0) and (freq[High Freq] >= freq[Low Freq]))
maxH = 1
If (CP = Edge)
{
    if (freq[SContone] = 9)         OP = Text on Tint
    else if (freq[Edge] > 0)        OP = Edge
    else if (CB = Low Freq)         OP = Low Freq
    else if (CB = High Freq)        OP = Text on Tint
    else                            OP = Edge
}
Else if ((CP = Fuzzy High) OR (CP = Fuzzy Low))
{
    if (maxH)                       OP = High Freq
    if (maxL)                       OP = Low Freq
    else                            OP = CB
}
Else if (CP = RContone)
{
    if (CB = Background) OR (CB = Edge)   OP = Edge
    else if (maxH)                  OP = High Freq
    else if (maxL)                  OP = Low Freq
    else                            OP = SContone
}
Else if ((CP = Low Freq) and (CB = Background))
{
    if (LFHT)                       OP = Low Freq
    else if (HFHT)                  OP = High Freq
    else                            OP = Edge
}
Else if ((freq[CP] ≧ 1) or (CB = Background))    OP = CP
/*if CP is in the neighboring blocks or CB is background, keep CP*/
Else OP = CB        /* replace with current block tag */
``` wherein CP is the current pixel level tag, OP is the output (cleaned) pixel level tag; CB is the current block level tag; and freq[image class] computes the frequency (number of occurrences) of that image class in the block level segmentation tags within the neighborhood window. It is understood that the above set of rules is provided by way of example to illustrate the generation of a block level tag as a function of one or more predominant tags, and one skilled in the art may identify different rules for generating a block level tag.

The tag pixel tag cleaner can embody or be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Specific algorithms may be accomplished using software in combination with specific hardware. In general, any device capable of implementing a finite state machine that is capable of implementing the pixel tag cleaning process described above can be used to realize the pixel tag cleaner.

Figure 11:
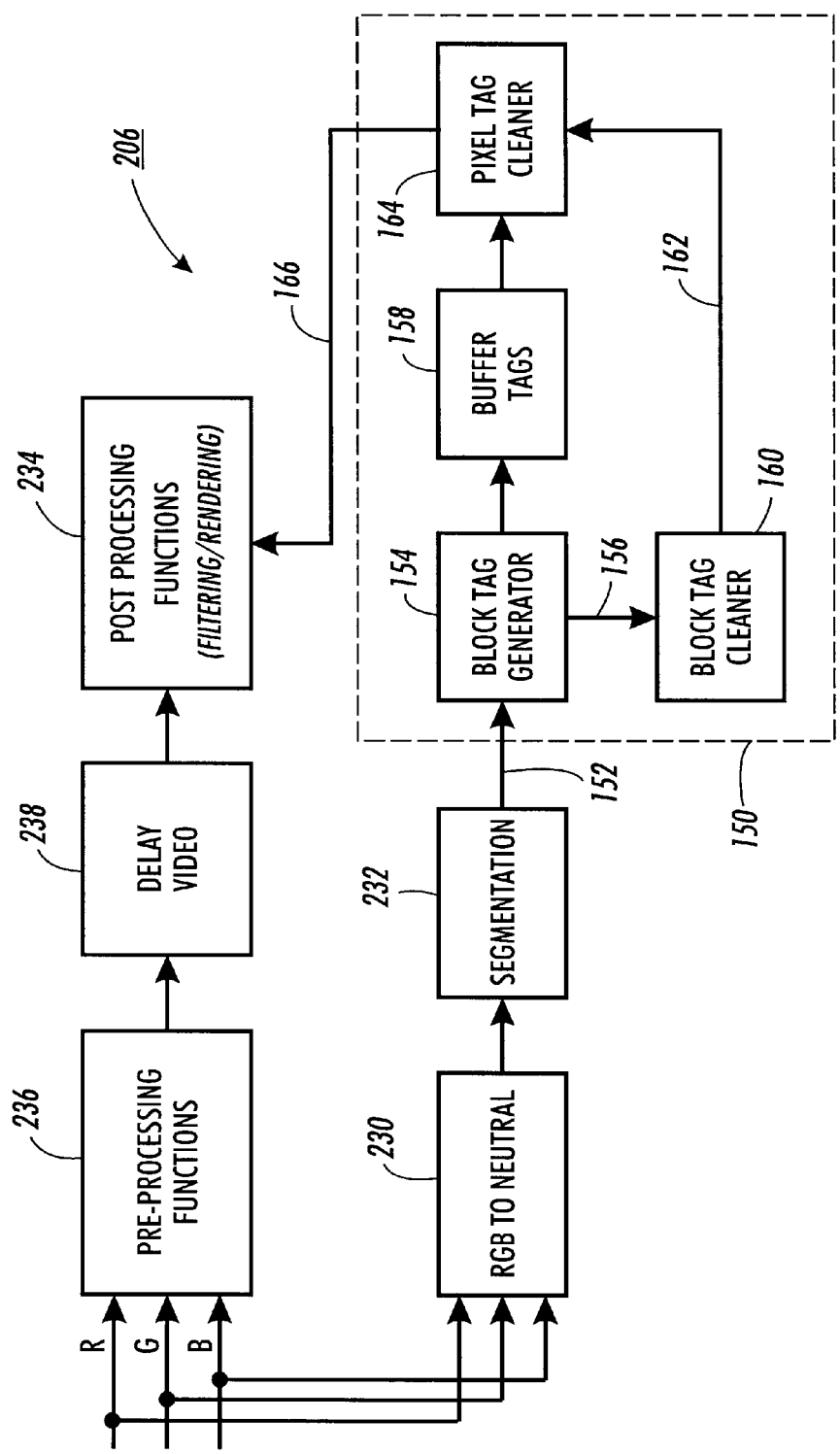
FIG. 11 is a block diagram of an image processing system that includes a system for processing segmentation tags in accordance with the present invention.

Having described each of the three segmentation tag processors (block tag generator, block tag cleaner and pixel tag cleaner) used to process segmentation tags, attention is now turned to a system for processing segmentation tag to reduce segmentation artifacts. Referring to FIG. 11, there is shown a block diagram of an embodiment of an image processing system IPS 206 that includes system 150 for processing segmentation tags that makes use of all three segmentation tag processors.

In FIG. 11, image data such as RGB video from a color scanning device is received by IPS 206 at RGB-to-Neutral module 230. Module 230 converts the image data to a n-bit neutral channel video data in a known manner such as by performing a linear combination of the three channels:

$$\text{Neutral (N)} = rWt*RED + gWt*GREEN + bWt*BLUE$$

where rWt, gWt and bWt are red, green and blue weighting coefficients respectively. The neutral channel video data is passed to a segmentation module 232. Segmentation module 232 uses any automatic image segmentation technique to analyze the video data, classify image pixels and generate pixel level segmentation tags 152 that identify pixel as a particular image class.

Pixel level segmentation tags 152 are coupled to block tag generator 154. Block tag generator 154 identifies a block of segmentation tags, compiles statistics for segmentation tags within the identified block and generates a block level tag 156 for the identified block of segmentation tags based upon the compiled statistics. Block tag generator passes the pixel level tags 152 to a tag buffer 158. Tag buffer 158 provides intermediate storage of pixel level tags and can be accomplished using a data compression operation such as LZ compression and subsequent storage in Electronic PreCollation memory, high bandwidth memory or similar operations.

Block level tags 156 from block tag generator 154 are passed to block tag cleaner 160. Block tag cleaner 160 operates to clean tags 156 based on a group of neighboring block level segmentation tags. Block tag cleaner can clean the block tags using morphological operations combined with heuristic rules or by statistically analyzing connected components of segmentation tags. Block tag cleaner provides cleaned block tags 162 to pixel tag cleaner 164.

Pixel tag cleaner 164 receives pixel level tags 152 from buffer 158 and cleaned block level tags 162 from block tag cleaner 160. Based on a neighborhood window of block tags, the pixel level tags are cleaned to generate cleaned pixel level tags 166. Cleaned pixel level tags 166 are passed to post processing module 234 where the cleaned tags are used in post-processing functions (e.g., filtering and rendering) on video image data received from pre-processing circuit 236 through video buffer 238.

Figure 12:
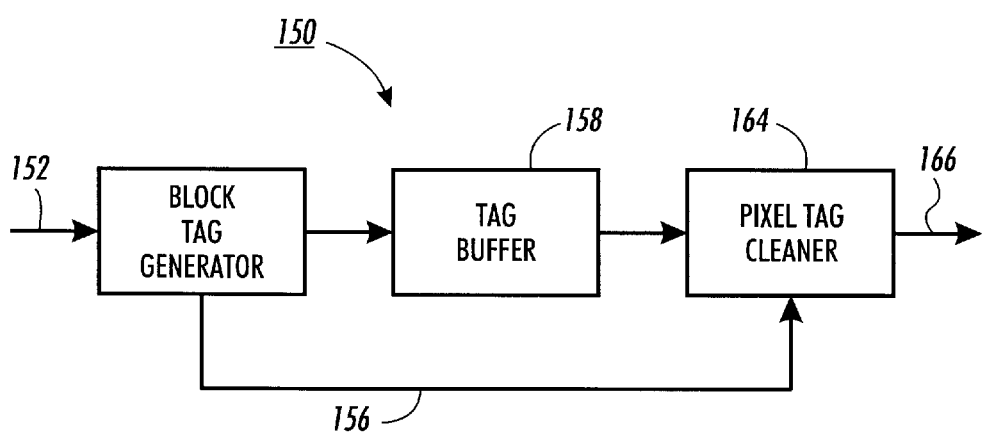
FIG. 12 is a block diagram of an embodiment a system for processing segmentation tags in accordance with the present invention.

As stated above, the system can comprise any combination of one or more of the segmentation tag processors described above to reduce segmentation artifacts. For example system 150 can be modified to eliminate the block tag cleaner as is shown in FIG. 12. System 150' of FIG. 12 processes segmentation tags using two segmentation tag processors (block tag generator 154 and pixel tag cleaner 164) to process the segmentation tags. In system 150' of FIG. 12, block tag generator 154 generates block level tags 156 from pixel level segmentation tags 152 as described above and passes the pixel level tags 152 to tag buffer 158. The block level tags 156 from block tag generator 154 are passed to pixel tag cleaner 164. Pixel tag cleaner 164 generates the cleaned pixel level tags 166 in the same manner described above except that the neighborhood window of block tags are selected from original block level tags 156 rather than cleaned block level tags 162.

What has thus been described is a system and method for processing segmentation tags. The system and method of the present invention identifies a block of segmentation tags, compiles statistics for segmentation tags within the identified block and generates a block level tag for the identified block of segmentation tags based upon the compiled statistics. The block level tag identifies a representative segmentation tag or tags for the segmentation tags within the identified block. Furthermore, the present invention can operate on either a block of pixel level segmentation tags or a block of block level segmentation tags.

The present invention has been described in detail above; however, various modifications can be implemented without departing from the scope of the present invention. Moreover, it is noted that the present invention has been described with reference to various embodiments disclosed herein, it is not to be confined to the details set forth above, but it is intended to cover such modifications or changes as made within the scope of the attached claims.

What is claimed is:

1. A system for generating a block level tag, comprising:

first and second statistic compilation circuits, each of the compilation circuits being connected to receive segmentation tags and compile a statistic for a plurality of the received segmentation tags;

an address controller connected to the first and second statistic compilation circuits, the address controller selecting one of the first and second compilation circuits to receive the segmentation tags;

a sorting circuit connected to receive the statistics compiled by the first and second statistic compilation circuits, the sorting circuit sorting the received statistics to identify the most predominant tag and the second most predominant segmentation tag within each block of segmentation tag and generate the block level tag as a function of the most predominant and the second most predominant segmentation tags; within the block.

2. The system of claim 1 wherein the function generates a block tag equal to the second most predominant segmentation tag when the most predominant tag indicates an image type selected from a fuzzy low frequency halftone, a fuzzy high frequency halftone and a intermediate frequency halftone and the second most predominant pixel level segmentation tag indicates an image type selected from high frequency halftone and low frequency halftone.

3. The system of claim 1 wherein the function generates a block tag equal to the second most predominant segmentation tag when the second most predominant segmentation tag indicates an image type of background and the most predominant tag indicates an image type selected from contone and high frequency halftone.

4. The system of claim 1 wherein the function generates a block tag equal to equal the second most predominant segmentation tag when the most predominant tag indicates an image type of contone and the second most predominant segmentation tag indicates an image type of low frequency halftone.

5. The system of claim 1, wherein the first and second statistic compilation circuits are connected to receive block level segmentation tags.

6. A method of processing segmentation tags to identify a block level tag, comprising:

identifying a block of the segmentation tags;

determining a most predominant segmentation tag value and a second most segmentation tag value from a plurality of the segmentation tags in the block; and generating a block level tag for the block as a function of the most predominant tag value and the second most predominant segmentation tag value within the block.

7. The method of claim 6, wherein the generating step sets the block level tag to equal both the most predominant segmentation tag and the second most predominant segmentation tag.

8. The method of claim 6, further including modifying the most predominant tag in accordance with a set of predetermined rules and wherein said block level tag is based upon the modified most predominant tag.

9. The method of claim 8 wherein the set of predetermined rules includes modifying the most predominant segmentation tag to equal the second most predominant segmentation tag when the most predominant tag indicates an image type selected from a fuzzy low frequency halftone, a fuzzy high frequency halftone and a intermediate frequency halftone and the second most predominant pixel level segmentation tag indicates an image type selected from high frequency halftone and low frequency halftone.

10. The method of claim 8 wherein the set of predetermined rules includes modifying the most predominant segmentation tag to equal the second most predominant segmentation tag when the second most predominant segmentation tag indicates an image type of background and the most predominant tag indicates an image type selected from contone and high frequency halftone.

11. The method of claim 8 wherein said set of predetermined rules comprises modifying the most predominant segmentation tag to equal the second most predominant segmentation tag when the most predominant tag indicates an image type of contone and the second most predominant segmentation tag indicates an image type of low frequency halftone.

12. The method of claim 6 wherein the identifying step comprises:

receiving the segmentation tags;

storing the received segmentation tags in a buffer; and selecting the block of tags from the segmentation tags stored in the buffer.

13. The method of claim 6 wherein the identifying step comprises receiving the segmentation tags; and storing each received segmentation tag in an associated block.

14. The method of claim 6, wherein the step of identifying a block of the segmentation tags identifies a block of block level segmentation tags.

15. The method of claim 6, wherein the step of identifying a block of the segmentation tags identifies a block of pixel level segmentation tags.

* * * * *